United States Patent
Foladare et al.

[19]

[11] Patent Number: 6,125,176
[45] Date of Patent: Sep. 26, 2000

[54] METHOD AND SYSTEM FOR ROUTING CALLS BASED ON CONDITIONS OF ELECTRONIC DEVICES

[75] Inventors: Mark Jeffrey Foladare, Kendall Park; Shelley B. Goldman, East Brunswick; David Phillip Silverman, Somerville; Roy Philip Weber, Bridgewater, all of N.J.

[73] Assignee: AT&T Corporation, New York, N.Y.

[21] Appl. No.: 08/877,077

[22] Filed: Jun. 17, 1997

[51] Int. Cl.⁷ ............................ H04M 3/42; H04M 1/723
[52] U.S. Cl. .............................................. 379/211; 379/913
[58] Field of Search .................................. 379/201, 207, 379/210, 211, 212, 214, 913

[56] References Cited

U.S. PATENT DOCUMENTS

| | | | |
|---|---|---|---|
| 4,313,035 | 1/1982 | Jordan et al. ....................... | 379/913 X |
| 4,658,416 | 4/1987 | Tanaka ................................. | 379/913 X |
| 5,243,645 | 9/1993 | Bissell et al. ....................... | 379/913 X |
| 5,315,636 | 5/1994 | Patel .................................... | 379/913 X |
| 5,533,113 | 7/1996 | Ozawa et al. ....................... | 379/201 X |
| 5,548,637 | 8/1996 | Heller et al. ....................... | 379/211 X |
| 5,822,418 | 10/1998 | Yacenda et al. .................... | 379/211 X |

*Primary Examiner*—Harry S. Hong
*Attorney, Agent, or Firm*—Oliff & Berridge, PLC

[57] ABSTRACT

A call routing system routes an incoming telephone call to a desired party based upon at least one of a plurality of conditions of at least one general purpose electronic device associated with the desired party. The call routing system includes a receiver, a processor, a selector and a routing device. The receiver receives the telephone call of the desired party. The processor determines the state of the desired party at the location of the received telephone call based on at least one general purpose electronic device. The selector selects one of a plurality of communication devices based upon the determined condition of the at least one electronic device. The routing device routes the telephone call to the selected one of the plurality of communication devices. A method for routing telephone calls is also described.

13 Claims, 3 Drawing Sheets

| PARTY | ELECTRONIC DEVICE | CONDITION | ELECTRONIC DEVICE | CONDITION/ SUBCONDITION | ROUTE TO COMMUNICATIONS DEVICE |
|---|---|---|---|---|---|
| 1 | COMPUTER | ON | | | 26 |
| 1 | TELEVISION | ON | TELEVISION | NEWS CHANNEL | 26 |
| 1 | COMPUTER | OFF | ALARM | ON | 34 |
| 1 | OVEN | ON | ALARM | OFF | 26 |
| 1 | CLOCK | AFTER 0800 | CLOCK | BEFORE 1300 | 44 |
| 1 | CLOCK | AFTER 1400 | CLOCK | BEFORE 1600 | 46 |
| ⋮ | ⋮ | ⋮ | ⋮ | ⋮ | ⋮ |

METHOD AND SYSTEM FOR ROUTING CALLS BASED ON CONDITIONS OF ELECTRONIC DEVICES

BACKGROUND OF THE INVENTION

1. Field of Invention

The present invention is directed to a method and a system for routing telephone calls based on conditions of electronic devices associated with the party being called. More particularly, the present invention is related to a method and system for forwarding calls of a party to an alternative telephone or beeper after it is determined that, based on the conditions of the party's electronic devices, the party is unavailable at the location where the electronic devices are situate.

2. Description of Related Art

In today's telecommunications industry, it is well recognized that a party to whom a call is directed may not be available at that particular location to accept the call. To resolve this problem, manufacturers of telecommunications devices have produced back-up systems such as telephone answering machines, voice mail services or even call forwarding services. Although these devices and services eventually alerts the party being called, on some occasions, the communication reaches the called party in an untimely manner. For example, in an emergency situation, it might be necessary to contact the party being called immediately. Leaving a message on an answering machine or in a voice mail system is inadequate in such an emergency situation. The call forwarding service might be adequate but it has drawbacks.

To use a call forwarding service, the user must first know the forwarding telephone number where he/she will be located at some future time. The user must then input this forwarding number into the telephone system. A major drawback is that the user might forget to input the forwarding telephone number into the telephone system.

Additionally, the user might change locations. Therefore, the user must cancel the previous forwarding telephone number and input a new forwarding telephone number at the desired location.

To alleviate these problems, the user can subscribe to a mobile telephone service. Now, telephone calls can now be forwarded to the user's mobile telephone number. However, the user might be at a location where mobile telephone services are inaccessible and that other ways of communicating with the user, for example, by regular telephone, would be more desirable. In this case, the user must remember to cancel the forwarded telephone number of the mobile telephone and input the telephone number of the more desirable regular telephone.

There is a need in the telecommunications industry to automatically route or forward calls to a party being called. There is also a need that the party being called would not be required to remember to input and/or change forwarding telephone numbers into the telephone system in order to use call forwarding services. By automatically routing or forwarding telephone calls of the party being called to expected locations or other communication devices, the party being called is now more capable of receiving urgent or emergency calls without being required to input and/or change the forwarding telephone number. These needs are satisfied by the present invention.

SUMMARY OF THE INVENTION

It is an object of the present invention to automatically route or forward telephone calls to any one of a plurality of telephone numbers regardless of the location or type of communication devices being used.

Another object of the invention is to determine whether a party being called is at a most likely location, such as at home or at an office, based upon the party's electronic devices situate at the most likely location.

Yet another object of the present invention is to route or forward telephone calls to the party being called based upon a condition or conditions of the party's electronic devices situate at the party's most likely location.

Accordingly, a method and system of routing telephone calls are hereinafter described. A call routing system of the present invention routes an incoming telephone call to a desired party based upon at least one of a plurality of conditions of at least one electronic device associated with the desired party. In its broadest form, the call routing system includes a receiver, a processor, a selector and a routing device. The receiver receives the incoming telephone call for the desired party. The processor determines the condition of the at least one electronic device upon receiving the telephone call. The selector selects one of a plurality of communication devices based upon the determined condition of the at least one electronic device. The routing device routes the telephone call to the selected one of the plurality of communications devices.

The call routing system also includes a database that has a look-up table of data. The data represents individual ones of a variety of conditions associated with the at least one electronic device and represents the plurality of communications devices with a selected one of the plurality of communications devices corresponding to the individual ones of the variety of conditions.

The method of routing telephone calls includes the steps of receiving a telephone call for a desired party and determining, upon receiving the telephone call, one of a plurality of conditions of at least one electronic device associated with the desired party. The method of the present invention for routing telephone calls also includes the steps of selecting one of a plurality of communications devices based upon the determined condition of the at least one electronic device and routing the telephone call to the selected one of the plurality of communication devices.

The selected one of the plurality of communication devices is retrieved from a database and can be either an on-site telephone situate in a vicinity of a selected location, an off-site telephone situate at another location remote from the selected location, a pager or a radio (mobile) telephone.

Although the condition of the at least one electronic device can be in either an ON state or an OFF state, the determined condition can also be one of a plurality of operating subconditions which occurs while the at least one electronic device is in the ON state. The at least one of the electronic devices can be a television, a radio, an oven, a telephone, a computer, a clock, a burglar alarm or any other type of electronic device commonly used in a home or an office.

The telephone calls are received at a selected location which can be either the party's home, office or other location where the at least one electronic device associated with the party is situate. It is preferred that the at least one electronic device is situate in a vicinity of the selected location.

BRIEF DESCRIPTION OF THE DRAWINGS

These and other objects of the present invention will become more readily appreciated and understood from a consideration of the following detailed description of the embodiments of the present invention when taken together with the accompanying drawings, in which.

DETAILED DESCRIPTION OF PREFERRED EMBODIMENTS

Figure 1:
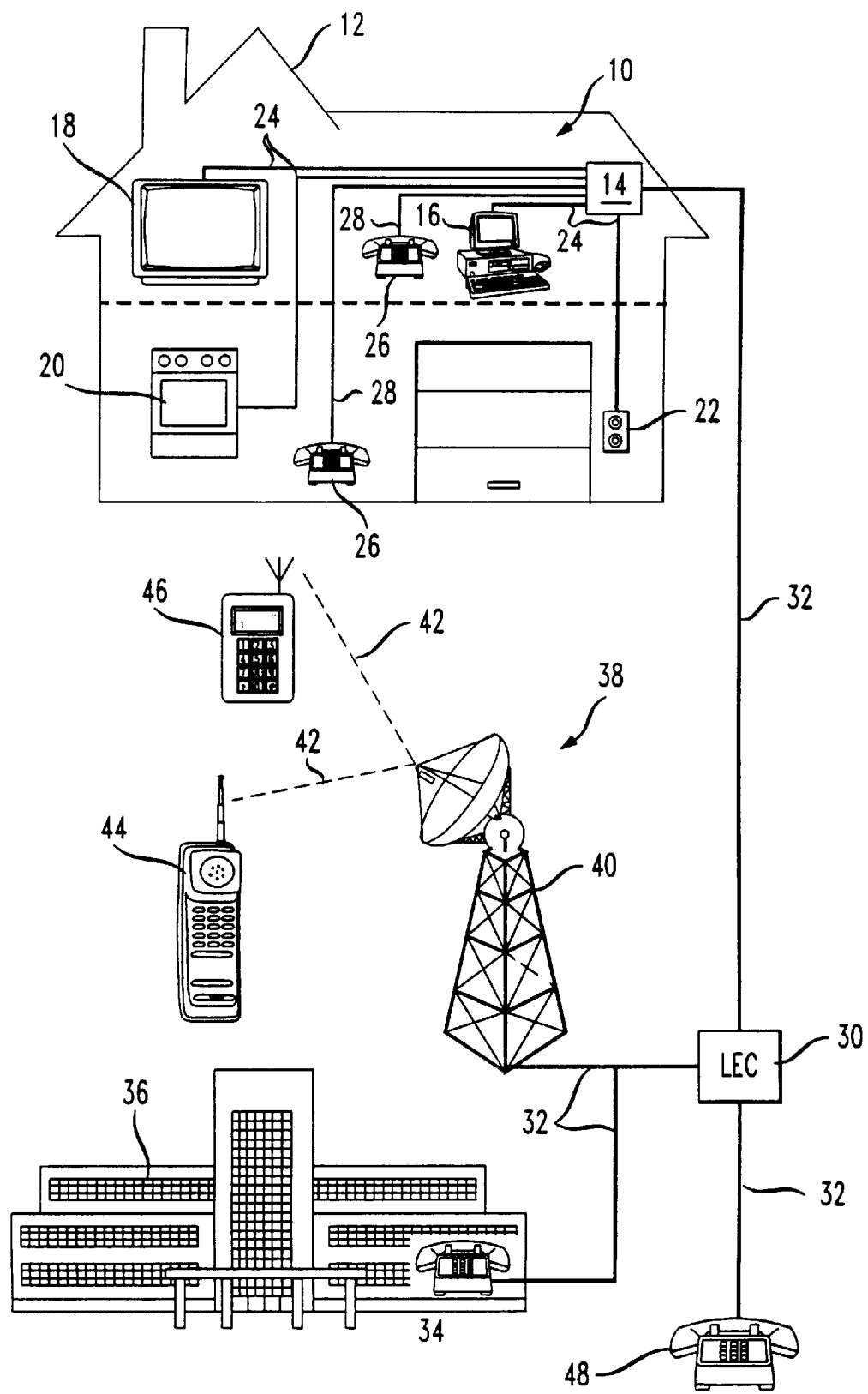
FIG. 1 is a schematic view of a call routing system of the present invention.

A call routing system 10 is generally introduced in FIG. 1. The call routing system 10 is disposed in a building structure such as a house 12 and includes a controller 14 connected to a plurality of electronic devices such as a computer 16, a television 18, an electric oven 20 and a burglar alarm 22 by a data bus 24. Also, the controller 14 is also connected, by way of example only, to a plurality of on-site telephones 26 by respective ones of indoor communication lines 28. Also, the controller 14 is connected to a local exchange carrier (LEC) 30 by a LEC communications line 32. As with any typical LEC 30, the LEC communications line 32 forms a network to connect the LEC 30 to other communication devices. Although not by way of limitation, these other communication devices are shown as an off-site telephone 34 situated in another building structure 36, such as an office building, and a wireless telecommunication system 38 as is well known in the telecommunications industry. The wireless telecommunication system 38 includes a microwave tower 40 that transmits and receives radio wave signals 42 from wireless communications devices such as a mobile (or radio) telephone unit 44 or a pager 46.

For simplicity of explanation, the LEC 30 is also connected to a calling telephone 48 by the LEC communications line 32. By way of example only, the calling telephone 48 places an incoming telephone call through the LEC 30 via the LEC communications line 32 to the controller 14 to contact a desired party. A skilled artisan would appreciate that the desired party is identified by a home telephone number which would be, at least during certain time periods, located at the party's house 12. Also, the desired party's telephone number is typically listed in a telephone directory by the party's home address. Therefore, it should be understood by one of ordinary skill in the art that one of the most likely locations of the desired party to be called would be at the desired party's house 12.

As explained in detail below, the call routing system 10 of the present invention routes the incoming telephone call to the desired party based upon at least one of a plurality of conditions of at least one electronic device, i.e., the computer 16, the television 18, the electric oven 20 and/or the burglar alarm 22, which are located at the desired party's house 12. Although not by way of limitation, it should be appreciated that other electronic devices are available to be used with the present invention. Also, the call routing system 10 of the present invention can also be used at other selected locations and it is preferred that at least one electronic device is situated in a vicinity of the selected location where the incoming telephone call is to be received.

Figures 2, 3:
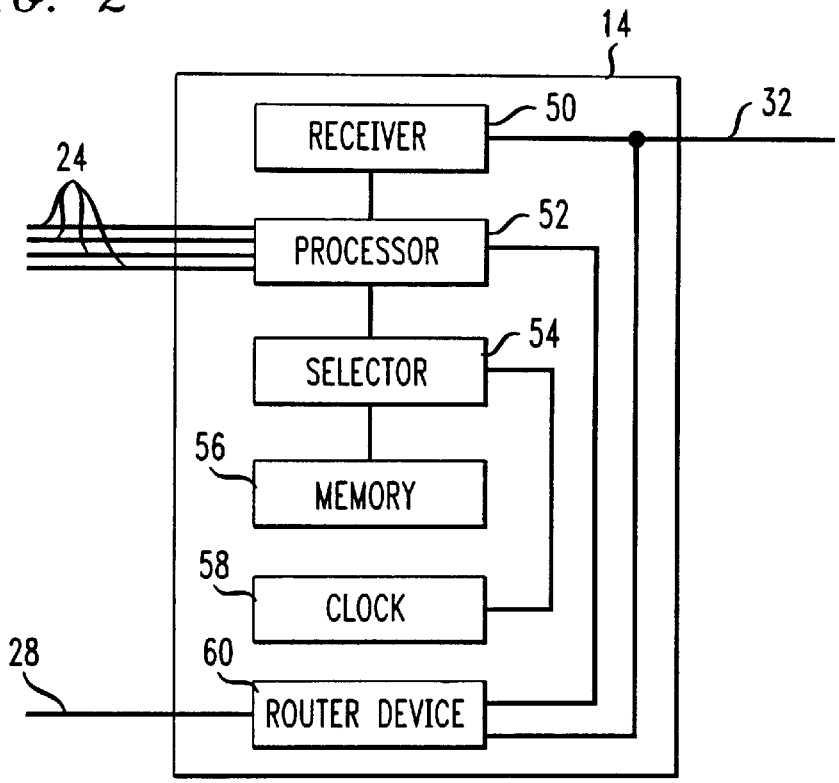
FIG. 2 is a block diagram of a controller of the call routing system of the present invention.
FIG. 3 is a table illustrating where a call is to be routed depending upon conditions of at least one electronic device.

As shown in FIG. 2, the controller 14 includes a receiver 50, a processor 52, a selector 54, a memory or a database 56, a clock 58 and a call router device 60. The receiver 50 receives the incoming telephone call from the calling telephone 48 for the desired party. The processor 52 determines a condition or a plurality of conditions of at least one of the electronic devices when the incoming telephone call is received. Based upon the determined condition or conditions of the at least one electronic device, the selector 54 selects one of a plurality of communication devices such as the on-site telephones 26, the mobile telephone unit 44 or the pager 46. The selection process is discussed in more detail below. Once the selector 54 selects one of the plurality of communication devices, the call routing device routes the telephone call to the selected one of the plurality of communication devices.

After the processor 52 which is individually connected to each of the plurality of electronic devices through the data bus 24 determines the condition of one or more of the electronic devices, the selector 54 can select one of the plurality of communication devices to which the telephone call is to be routed from the database 56. Also, the selector 54 can select one of the plurality of communication devices using a combination of the database 56 and the clock 58.

A look-up table of the database 56 is illustrated by way of example only in FIG. 3. The look-up table includes data that represent the plurality of electronic devices, a variety of conditions associated with the electronic devices and the plurality of communication devices to which the telephone call is to be routed depending upon the conditions associated with the electronic devices. Note that the look-up table routes the telephone call only to party 1, although one of ordinary skill in the art would appreciate that multiple parties can be included in the look-up table as long as each party is identifiable by an individually unique telephone number. Further, as illustrated in FIG. 3, routing a telephone call to party 1 can occur by determining the condition of one or more electronic devices. For example, as shown in FIG. 3, when the condition of the computer 16 is in an ON state, the telephone call is routed to party 1 to the on-site telephones 26. Another example shows that when the television 18 is in the ON state and a subcondition of the television 18 indicates that the television is tuned to a "news channel", the telephone call is routed to the on-site telephones 26. Thus, the desired party, party 1, is most likely in the house 12 and, therefore, the call routing system 10 directs the phone call to the on-site telephones 26 situate within the house 12.

Yet another example is that the condition of the computer 16 is in an OFF state and the condition of the burglar alarm 22 is in an ON state. These conditions of the electronic devices would indicate that party 1 is not at home. Thus, the call routing system 10 routes the call to the off-site telephone 34 that is located in the building structure 36 which might be an office building. Yet another example is that party 1 might be a gourmet cook. Thus, when the condition of the electric oven 20 is in an ON state and the burglar alarm is in an OFF state, the telephone call is routed to the on-site telephones 26 because these conditions indicate that party 1 is in the house 12.

The conditions of the clock 58 might also be determined by the processor 52. For example, as illustrated in FIG. 3, if the condition, i.e., the time on the clock, is after 0800 (i.e., 8:00 a.m.) but before 1300 (i.e., 1:00 p.m.), the telephone call is routed to the mobile telephone unit 44 of party 1. However, if the condition of the clock is after 1400 (i.e., 2:00 p.m.) but before 1600 (i.e., 4:00 p.m.), the telephone call is routed to the pager 46 of party 1.

The above-described examples simply demonstrate the functionality of the call routing system 10 of the present invention. One of ordinary skill in the art would appreciate that other electronic devices such as a thermostat, a clothes washer, a clothes dryer and any other types of electronic devices that are used in a house, an office or other location where the desired party might be can be used to implement the call routing system 10 of the present invention.

As shown in FIGS. 1 and 2, the controller 14 is preferably implemented on a programmed general purpose computer. However, the controller 14 can also be implemented on a special purpose computer, a programmed microprocessor or microcontroller and peripheral integrated circuit elements, an ASIC or other integrated circuit, a hardwired electronic or logic circuit such as a discrete element circuit, a programmable logic device such as a PLD, PLA, FGPA or PAL, or the like. In general, any device on which a finite state machine capable of implementing the flowcharts shown in FIG. 4 can be used to implement the controller 14.

As shown in FIG. 2, the memory or database 56 is preferably implemented using static or dynamic RAM. However, the memory or database 56 can also be implemented using a floppy disk and disk drive, a writable optical disk and disk drive, a hard drive, flash memory or the like. Also as shown in FIG. 2, the memory or database 56 can be implemented using a ROM. However, the memory or database 56 can also be implemented using a PROM, an EPROM, an EEPROM, or a CD-ROM and disk drive or the like.

Further, the skilled artisan would appreciate that the plurality of communication devices can be identical communication devices such as the on-site telephones 26 and the off-site telephone 34 or could be different communication devices such as the on-site telephones 26, the mobile telephone unit 44 and the pager 46.

Figure 4:
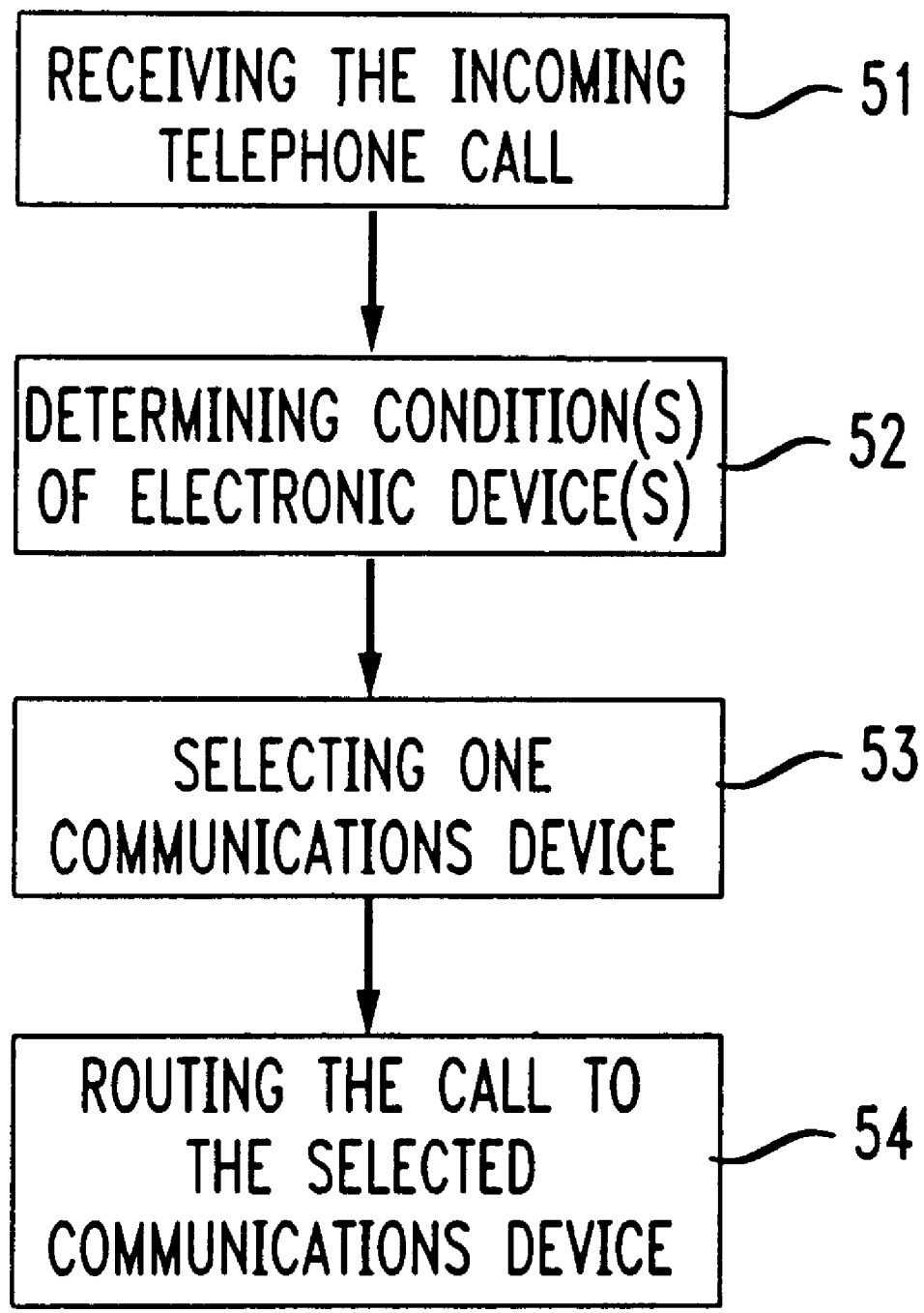
FIG. 4 is a flow chart of steps to perform a method of the present invention for routing telephone calls.

FIG. 4 depicts a method of the present invention of routing telephone calls. The first step S1 is receiving the telephone call for a desired party. The next step S2 is determining, upon receiving the telephone call, one of a plurality of conditions of at least one electronic device that is associated with the desired party. The next step S3 is selecting one of a plurality of communications devices based upon the determined condition of the at least one electronic device. Step S3 can include retrieving data from a database that represents the selected one of the communication devices. Step S4 is routing the telephone call to the selected one of the plurality of communications devices.

The call routing system and the method of routing telephone calls of the present invention automatically forward or route calls to any one of a plurality of communication devices regardless of the location of the communication device or type of communication device being used. After inputting the appropriate data into the database, there is no need for a user to continuously input or change forwarding telephone numbers or even has to remember to do so because the present invention determines whether a party is at a most likely location based upon the party's electronic devices that are situate at the most likely location. Incoming telephone calls are forwarded or routed to the party based upon either a single condition of an electronic device associated with the party or multiple conditions of either a single electronic device or a plurality of electronic devices associated with the party.

Although the present invention has been described in connection with the preferred embodiments, it should be appreciated that modification or changes may be made to the embodiments of the present invention without departing from the inventive concepts contained herein.

What is claimed is:

1. A method of routing telephone calls, comprising the steps of:
   receiving a telephone call for a desired party;
   determining, upon receiving the telephone call, the presence or absence of the desired party at a location of the received telephone call based upon one of a plurality of conditions of at least one electronic device associated with the desired party at the location of the received telephone call, such electronic device not being primarily for the purpose of tracking said desired party;
   selecting one of a plurality of communications devices based upon the determined condition of the at least one electronic device; and
   routing the telephone call to the selected one of the plurality of communications devices.

2. A method according to claim 1, wherein the step of selecting one of the plurality of communications devices includes the step of retrieving data from a database that represents the selected one of the communications devices.

3. A method according to claim 1, wherein the selected one of the communications devices is one of an on-site telephone situate in a vicinity of a selected location, an off-site telephone situate at another location remote from the selected location, a pager and a radio telephone.

4. A method according to claim 1, wherein the determined condition of the at least one electronic device is one of an ON state and an OFF state.

5. A method according to claim 4, wherein the determined condition of the at least one of the desired party's electronic devices is one of a plurality of operating subconditions while the at least one of the desired party's electronic devices is in the ON state.

6. A method according to claim 1, wherein the at least one of the desired party's electronic devices is one of a television, a radio, an oven, a telephone, a computer and a burglar alarm.

7. A method according to claim 1, wherein the telephone call is received at a selected location.

8. A method according to claim 7, wherein the at least one electronic device is situate in a vicinity of the selected location.

9. A call routing system for routing an incoming telephone call to a desired party based upon determining the presence or absence of the desired parts at a location of the received telephone call using at least one of a plurality of conditions of at least one general purpose electronic device associated with the desired party at the location of the received telephone call, the call routing system comprising:
   means for receiving the telephone call for the desired party;
   means for determining the at least one of the plurality of conditions of the at least one general purpose electronic device upon receiving the telephone call;
   means for selecting one of a plurality of communications devices based upon the determined condition of the at least one electronic device; and
   means for routing the telephone call to the selected one of the plurality of communications devices.

10. A call routing system according to claim 9, further comprising a database having a look-up table of data representing individual ones of a variety of conditions associated with the at least one electronic device and representing the plurality of communications devices with a selected one of the plurality of communications devices corresponding to the individual ones of the variety of conditions.

11. A call routing system according to claim 10, wherein the represented plurality of communications devices are one of different communications devices and identical communications devices.

12. A call routing system for routing an incoming telephone call to a desired party based upon at least one of a plurality of conditions of at least one electronic device associated with the desired party, the call routing system comprising:

a receiver for receiving the telephone call for the desired party;

a processor for determining the condition of the at least one general purpose electronic device associated with the desired party at the location of the received telephone call upon receiving the telephone call;

a selector for selecting one of a plurality of communications devices based upon the determined condition of the at least one general purpose electronic device; and a routing device for routing the telephone call to the selected one of the plurality of communications devices.

13. A call routing system according to claim 12, further comprising a database having a look-up table of data representing individual ones of a variety of conditions associated with the at least one electronic device and representing the plurality of communications devices with a selected one of the plurality of communications devices corresponding to the individual ones of the variety of conditions.

\* \* \* \* \*